US012432330B2

(12) United States Patent
Friedman et al.

(10) Patent No.: US 12,432,330 B2
(45) Date of Patent: Sep. 30, 2025

(54) HEAD-MOUNTED ELECTRONIC DEVICE WITH RELIABLE PASSTHROUGH VIDEO FALLBACK CAPABILITY

(71) Applicant: Apple Inc., Cupertino, CA (US)

(72) Inventors: Michael C Friedman, Nederland, CO (US); Russell L Jones, Westminster, CO (US); Kaushik Raghunath, Pleasanton, CA (US); Venu M Duggineni, San Jose, CA (US); Ranjit Desai, Cupertino, CA (US); Manjunath M Venkatesh, San Fransisco, CA (US); Michael J Rockwell, Palo Alto, CA (US); Arun Kannan, Mountain View, CA (US); Saul H Weiss, Parker, CO (US)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 18/462,161

(22) Filed: Sep. 6, 2023

(65) Prior Publication Data
US 2024/0098234 A1    Mar. 21, 2024

Related U.S. Application Data

(60) Provisional application No. 63/408,043, filed on Sep. 19, 2022.

(51) Int. Cl.
*H04N 13/133*    (2018.01)
*H04N 13/344*    (2018.01)
*H04N 13/383*    (2018.01)

(52) U.S. Cl.
CPC ......... *H04N 13/133* (2018.05); *H04N 13/344* (2018.05); *H04N 13/383* (2018.05)

(58) Field of Classification Search
None
See application file for complete search history.

(56) References Cited

U.S. PATENT DOCUMENTS

| 8,392,695 | B1 * | 3/2013 | Lachwani ........... G06F 11/0787 |
| | | | 714/24 |
| 9,741,169 | B1 | 8/2017 | Holz |
| 10,203,762 | B2 | 2/2019 | Bradski et al. |
| 11,676,329 | B1 | 6/2023 | Ma et al. |
| 11,720,171 | B2 | 8/2023 | Pastrana Vicente et al. |

(Continued)

FOREIGN PATENT DOCUMENTS

| WO | 2022067001 A1 | 3/2022 |
| WO | 2023049287 A1 | 3/2023 |

*Primary Examiner* — Mikhail Itskovich
(74) *Attorney, Agent, or Firm* — Treyz Law Group; Jason Tsai

(57) ABSTRACT

A head-mounted device is provided that includes one or more cameras configured to acquire a raw video feed and one or more displays configured to present a passthrough video feed to a user. Generation of the passthrough video feed can involve processing the raw video feed using an image signal processor and auxiliary compute blocks. One or more of the auxiliary compute blocks can be bypassed in response to detecting one or more failures associated with the auxiliary compute blocks. Configured and operated in this way, the head-mounted device can fall back to a more reliable passthrough video feed without having to power cycle the head-mounted device when a failure occurs.

22 Claims, 6 Drawing Sheets

(56) References Cited

U.S. PATENT DOCUMENTS

| | | |
|---|---|---|
| 2012/0249416 A1 | 10/2012 | Maciocci et al. |
| 2019/0064522 A1 | 2/2019 | Reif |
| 2019/0158795 A1 | 5/2019 | Chun et al. |
| 2019/0208181 A1 | 7/2019 | Rowell et al. |
| 2019/0387168 A1 | 12/2019 | Smith et al. |
| 2020/0098097 A1 | 3/2020 | Rodriguez et al. |
| 2020/0336719 A1* | 10/2020 | Morisawa ............ H04N 13/239 |
| 2022/0292790 A1 | 9/2022 | Lohr et al. |
| 2023/0144091 A1 | 5/2023 | Forutanpour et al. |
| 2023/0161613 A1* | 5/2023 | Rajendran ................. G06F 8/52 718/1 |

* cited by examiner

HEAD-MOUNTED ELECTRONIC DEVICE WITH RELIABLE PASSTHROUGH VIDEO FALLBACK CAPABILITY

This application claims the benefit of U.S. Provisional Patent Application No. 63/408,043, filed Sep. 19, 2022, which is hereby incorporated by reference herein in its entirety.

FIELD

This relates generally to electronic devices, and, more particularly, to electronic devices such as head-mounted devices.

BACKGROUND

Electronic devices such as head-mounted devices may have cameras for capturing a video feed of an external environment and one or more displays for presenting the captured video feed to a user. Head-mounted devices can include hardware or software subsystems for processing the video feed, such as hardware/software subsystems for performing gaze tracking, hands gesture tracking, or rendering of virtual content on top of the real-world content in the video feed.

It can be challenging to design a head-mounted device in which the user is presented with such passthrough video feed. When one or more of these subsystems crash, the head-mounted device can simply restart the failing components. Restarting applications when a system failure or crash occurs can be problematic, especially when the user is relying on the passthrough video feed to navigate the external environment. If care is not taken, the visual quality of the video feed can also degrade, resulting in visual discomfort for the user.

SUMMARY

An electronic device such as a head-mounted device may include one or more cameras for capturing a video feed of a real-world environment and one or more displays for presenting the a passthrough video feed to a user. The electronic device may include processing circuitry for performing one or more processing functions on the captured video feed to generate the passthrough video feed. The processing circuitry can include dedicated compute blocks such as an image signal processor and can also include auxiliary compute blocks for performing application-level functions on the video feed. The electronic device can be operable in multiple video passthrough modes depending on whether one or more processing blocks in the processing circuit is failing or is otherwise operating in an unreliable manner. For instance, switching from a full-featured video passthrough mode to a relatively simpler video passthrough mode that is more reliable can help protecting a user's visual comfort and awareness of his or her surroundings.

An aspect of the disclosure provides a method of operating an electronic device that includes acquiring a video feed using at least one image sensor, identifying a condition of processing circuitry, determining whether to operate in a first video passthrough mode or a second video passthrough mode based on the identified condition of the processing circuitry, displaying a passthrough video feed by using the processing circuitry to perform a processing function on the video feed from the at least one image sensor while operating in the first video passthrough mode, and displaying a passthrough video feed based on the video feed from the at least one image sensor without performing the processing function while operating in the second video passthrough mode.

The processing function performed by the processing circuitry during the first video passthrough mode can include extended reality content generation, gaze tracking, head pose tracking, dynamic foveation, point of view correction, distortion compensation, and 3-dimensional matting. Operations for identifying the condition of the processing circuitry can include detecting a failure in the processing circuitry, detecting unstable operation of the processing circuitry, detecting a kernel panic signal, detecting expiration of a watchdog timer, monitoring at least one parameter associated with the processing circuitry to detect whether the at least one parameter is stale, missing, or invalid, and/or detecting one or more error signals from processing circuitry. If desired, the processing circuitry can apply a real-time adjustment to the video feed during the first video passthrough mode and can alternatively apply a default (fallback) adjustment to the video feed during the second video passthrough mode to ensure a more stable video feed experience for the user.

An aspect of the disclosure provides a method for switching an electronic device among at least first, second, and third video passthrough modes. The method can include: using one or more cameras to acquire a video feed; using an image signal processor to process the video feed; using a plurality of auxiliary compute blocks to selectively process the video feed; during the first video passthrough mode, displaying a passthrough video feed by processing the video feed using the image signal processor and using the plurality of auxiliary compute blocks; determining whether a first mode switching condition or a second mode switching condition has been met; in response to determining that the first mode switching condition has been met, switching from the first video passthrough mode to the second video passthrough mode and displaying, during the second video passthrough mode, a passthrough video feed by processing the video feed using the image signal processor while bypassing the plurality of auxiliary compute blocks or while using fallback values for the plurality of auxiliary compute blocks; and in response to determining that the second mode switching condition has been met, switching from the first video passthrough mode to the third video passthrough mode and displaying, during the third video passthrough mode, a passthrough video feed by processing the video feed using the image signal processor while bypassing a subset of the plurality of auxiliary compute blocks or while using fallback values for the subset of the plurality of auxiliary compute blocks.

DETAILED DESCRIPTION

An electronic device such as a head-mounted device may have a front face that faces away from a user's head and may have an opposing rear face that faces the user's head. One or more cameras on the front face of the device may be used to capture a live passthrough video stream of the external real-world environment. One or more displays on the rear face of the device may be used to present the live passthrough video stream to a user's eyes.

The head-mounted device may include dedicated computation blocks for performing basic processing on the passthrough video stream and may also include auxiliary computation blocks (sometimes referred to as application-level subsystems) for selectively performing more complex or advanced processing on the passthrough video stream. The dedicated computation blocks can provide basic image signal processing functions, whereas the auxiliary computation blocks can provide extensible video processing functions such as gaze tracking (or tracking of other body parts), point of view correction, rendering of virtual content, dynamic foveation, distortion compensation, etc.

Figure 1:
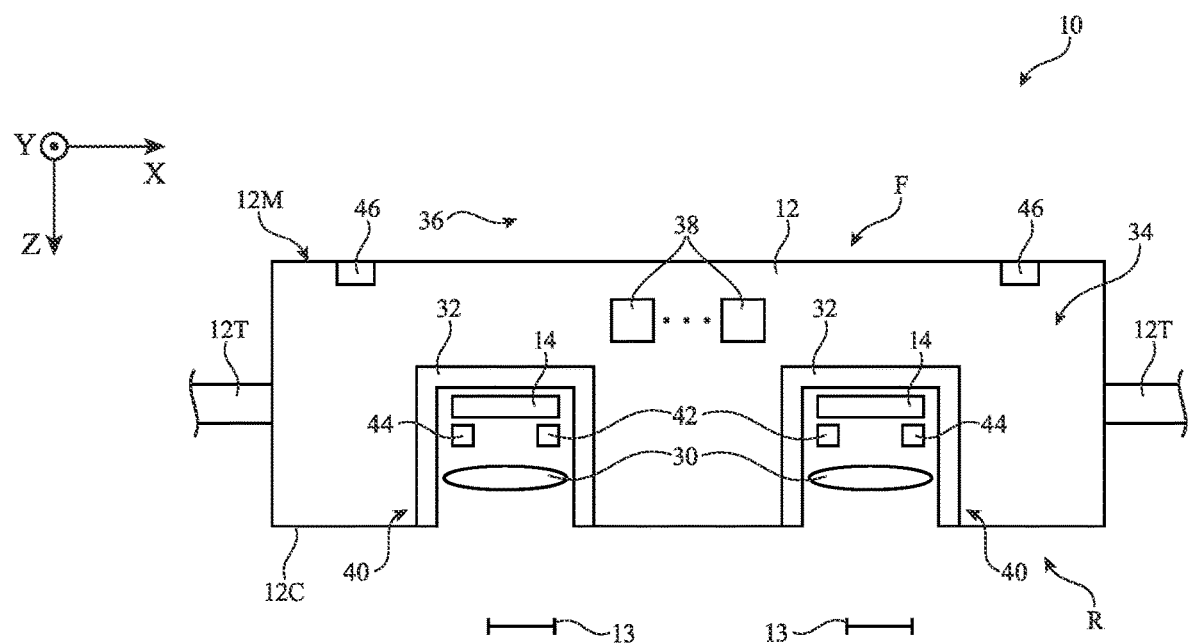
FIG. 1 is a top view of an illustrative head-mounted device in accordance with some embodiments.

During operation, some of the functions associated with the auxiliary computation blocks can crash or fail, resulting in a system failure or other instability in the passthrough video feed. To protect the user's visual comfort and awareness of his or her surroundings, in response to detecting a condition of the processing circuitry such detecting a system failure or instability, the head-mounted device can automatically switch or fall back on a reliable (or stable) passthrough video feed that only relies on the dedicated compute blocks (while bypassing, deactivating, or using default/fallback settings for the auxiliary computation blocks) or that only relies on functional compute blocks (while bypassing, deactivating, or using default settings for any failing computation blocks). The failure or instability detection scheme can rely on detecting a kernel panic signal or expiration of a watchdog timer, self-reporting from the auxiliary compute blocks, active monitoring of system parameters, and/or detection of other suitable condition to infer when one or more auxiliary compute blocks might have crashed. By falling back to a more reliable passthrough video feed in this way, the head-mounted device can avoid restarting the system when a crash occurs while minimizing visual discomfort for the user. A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures, and these rigid walls may optionally be covered with electrical components, fabric, leather, or other soft materials, etc. Housing portion 12M may also have internal support structures such as a frame (chassis) and/or structures that perform multiple functions such as controlling airflow and dissipating heat while providing structural support.

The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, spectacles, a hat, a mask, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one or more cameras such as cameras 46 of FIG. 1. Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Figure 2:
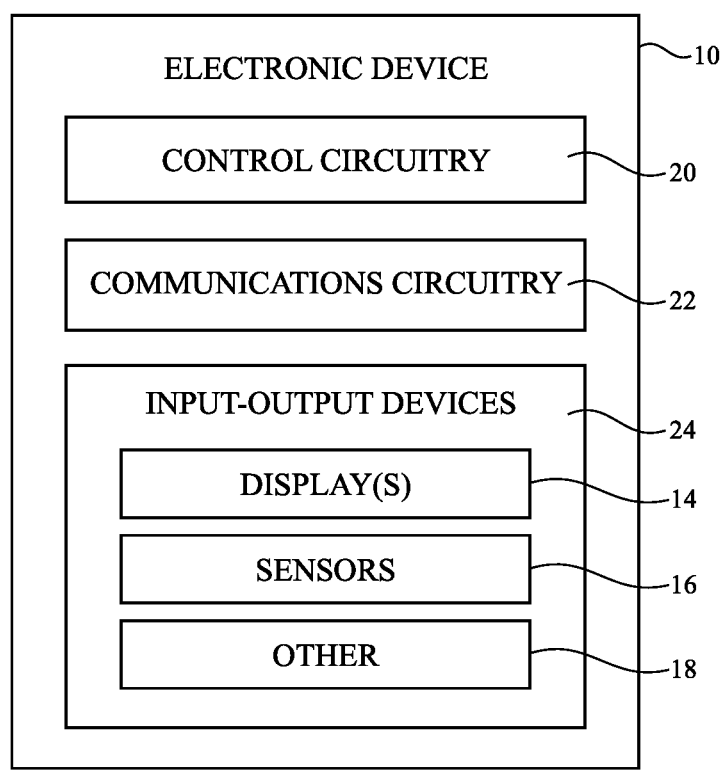
FIG. 2 is a schematic diagram of an illustrative head-mounted device in accordance with some embodiments.

A schematic diagram of an illustrative electronic device such as a head-mounted device or other wearable device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 2.

As shown in FIG. 2, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. One or more processors in control circuitry 20 may be used to gather input from sensors and other input devices and may be used to control output devices. The processing circuitry may be based on one or more processors such as microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output. Control circuitry 20 may be configured to perform operations in device 10 using hardware (e.g., dedicated hardware or circuitry), firmware, and/or software. Software code for performing operations in device 10 may be stored on storage circuitry (e.g., non-transitory (tangible) computer readable storage media that stores the software code). The software code may sometimes be referred to as program instructions, software, data, instructions, or code. The stored software code may be executed by the processing circuitry within circuitry 20.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device or a controller, computer stylus, or other input device, speakers or other output devices, etc.) over a wireless link.

For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion of device 10 and/or information about a pose of a user's head (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Display(s) 14 can be used to present a variety of content to a user's eye. The left and right displays 14 that are used to present a fused stereoscopic image to the user's eyes when viewing through eye boxes 13 can sometimes be referred to collectively as a display 14. As an example, virtual reality (VR) content can be presented by display 14. Virtual reality content may refer to content that only includes virtual objects within a virtual reality (computer-generated) environment. As another example, mixed reality (MR) content can be presented by display 14. Mixed reality content may refer to content that includes virtual objects and real objects from the real-world physical environment in which device 10 is being operated. As another example, only real-world content can be presented by display 14. The real-world content may refer to images being captured by one or more front-facing cameras (see, e.g., cameras 46 in FIG. 1) and passed through as a live feed to the user. The real-world content being captured by the front-facing cameras is therefore sometimes referred to as a camera passthrough feed, a (live) video passthrough feed, or a passthrough video feed (stream).

Figure 3:
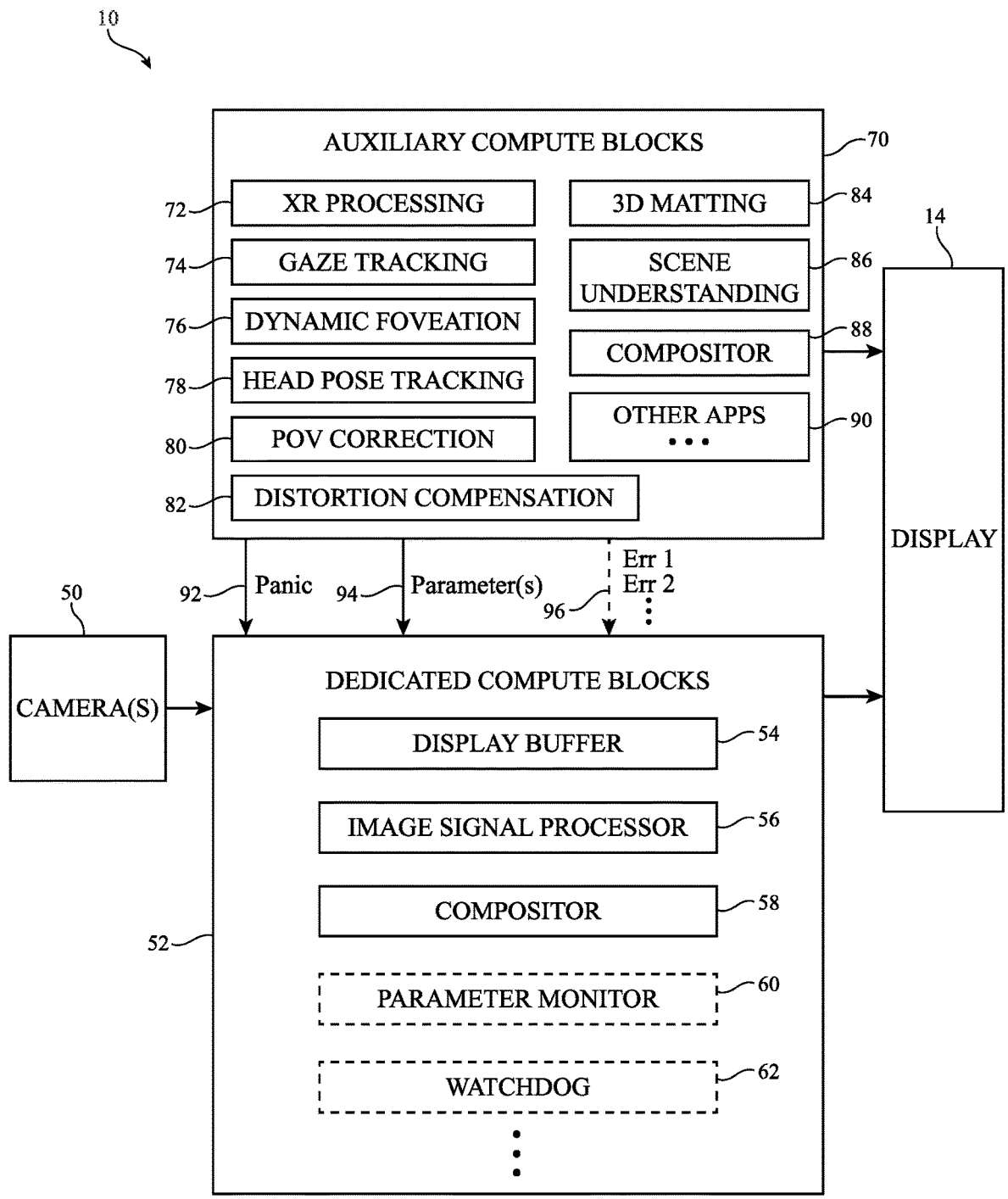
FIG. 3 is a diagram showing illustrative dedicated compute blocks and auxiliary compute blocks configured to process a passthrough video stream in accordance with some embodiments.

FIG. 3 is a diagram showing how the passthrough video feed captured by the front-facing cameras in device 10 can be processed using one or more computation (compute) blocks before being output by display 14. As shown in FIG. 3, one or more cameras 50 may capture and output a passthrough video feed to dedicated compute blocks 52. Camera(s) 50 may represent front-facing camera(s) 46 and/or other cameras that can be used to capture images of the external real-world environment surrounding device 10. The video feed output from camera 50 can sometimes be referred to as the raw video feed. The dedicated compute blocks 52 may include hardware and/or software blocks (subsystems) configured to perform basic image signal processing on the raw video feed to generate a processed passthrough video feed.

Dedicated compute blocks 52 may include a display buffer 54 configured to store or buffer the passthrough video feed while it is being processing by the various compute blocks within device 10. Dedicated compute blocks 56 may include an image signal processing (ISP) block such as image signal processor 56 configured to perform classic ISP functions that only rely on the input of the live camera feed itself. For example, ISP block 56 may be configured to perform automatic exposure for controlling an exposure setting for the passthrough video feed, automatic color correction (sometimes referred to as automatic white balance) for controlling a white balance, tone curve mapping, gamma correction, shading correction, noise reduction, black level adjustment, demosaicing, image sharpening, high dynamic range (HDR) correction, color space conversion, and/or other image signal processing functions (just to name a few).

Dedicated compute blocks 52 might also include an image compositor such as compositor 58. Compositor 58 can be used to overlay a relatively simple image on top of the passthrough video feed. In response to detecting a system failure or other instability associated with the passthrough video feed, compositor 58 may be directed to overlay a text image alerting the user of a possible error or fault. For example, compositor 58 can overlay a text that reads "please remove the headset" upon detecting one or more system errors or possible instability in the live passthrough video stream. If desired, compositor 58 can be used to overlay other types of warning messages or alerts for the user. Display 14 may receive a processed passthrough video feed from dedicated compute blocks 52.

In additional to the dedicated compute blocks 52, device 10 can further include auxiliary compute blocks 70. In contrast to the dedicated compute blocks 52, auxiliary compute blocks 70 may include hardware and/or software blocks (subsystems) configured to selectively perform higher-level image adjustments that might depend not only on the camera feed itself but also on information gathered from other sensors in device 10. In the example of FIG. 3, the auxiliary compute blocks 70 can include an extended reality (XR) processing block such as XR processor 72 configured to overlay virtual content on top of the real-world content in the passthrough video feed, a gaze tracking block such as gaze tracker 74 configured to track the user's gaze when viewing display 14, a dynamic foveation block such as dynamic foveation subsystem 76 configured to locally enhance the image resolution of the video feed in the area of the user's gaze (while decreasing the image resolution of the video feed in areas not aligned with the user's gaze), a head pose tracking block such as head tracker 78 configured to track the user's head pose (e.g., to track the yaw, pitch, roll, or other movement associated with the user's head), a point of view (POV) correction block such as POV correction subsystem 80 configured to adjust the passthrough video feed to fix any issues associated with the perspective (or tilt) of camera 50 relative to the objects captured by camera 50, a distortion compensation block such as distortion compensation subsystem 82 configured to adjust the passthrough video feed to fix any issues associated with the distortion caused of the lens(es) in camera 50 and/or the lens(es) in display 14, a 3-dimensional (3D) matting block such as 3D matting subsystem 84 configured to compute depth information in the captured images, a scene understanding block such as scene understanding subsystem 86 configured to detect various types of objects in the captured images (e.g., to detect whether a static object is a wall, to detect whether a moving object is a dog, etc.), an image compositor such as compositor 88 configured to overlay VR content generated from block 72 or content from other applications on the passthrough video feed, and/or other compute blocks 90 associated with other software or higher-level applications. In general, XR processor 72 can be configured to generate virtual reality (VR) content, augmented reality (AR) content, mixed reality (MR) content, or may be used to carry out other graphics processing functions. Auxiliary compute blocks 70 of such types are sometimes referred to as application-level or application subsystems. Auxiliary compute blocks 70 may apply various adjustments and corrections to the passthrough video feed before the processed video feed is output by display 14. The dedicated compute blocks 52 and the auxiliary compute blocks 70 may collectively be referred to as processing circuitry.

In accordance with an embodiment, device 10 can automatically switch (or fall back) to a reliable passthrough video feed when a system error that might otherwise cause the passthrough video feed to fail occurs or when detecting an instability in a parameter associated with the passthrough video feed, thus protecting the user's visual comfort and awareness of his or her surroundings. For instance, device 10 can detect when one or more of the auxiliary compute blocks 70 has crashed or is outputting faulty data. As an example, an operating-system-level kernel panic signal (panic flag) or other general fault signal might be output on path 92 when any one or more of the auxiliary compute blocks has failed. The kernel panic signal might be asserted when detecting a memory error and/or when detecting a bug in the operating system (as examples).

As another example, the system can actively monitor individual parameters output by the auxiliary compute blocks 70 on paths 94. In such embodiments, device 10 may include a parameter monitoring block 60 for monitoring the parameters on paths 94. The parameters on path 94 can include VR/AR/MR content generated from XR processing block 72 (e.g., block 60 or 62 can be used to monitor the virtual content output from the auxiliary compute blocks 70). In such active monitoring scheme, the system can detect a specific failure by detecting whether one or more parameters is stale (e.g., by observing repeated frames or repeated virtual content that should otherwise be updated on a regular basis), by detecting whether one or more parameters is missing (e.g., by observing a complete lack of frames or virtual content that should otherwise be present), and/or by detecting whether one or more parameters is invalid (e.g., by observing an invalid or varying framerate or observing that a parameter is outside an expect range of values). The number of repeated frames that would be considered as a failure can be adjustable. If desired, device 10 may also include a timer such as a watchdog timer 62 that monitors when one or more hardware/software subsystems 70 has timed out or stopped operating. For example, watchdog timer 62 can be configured to monitor recent activity of one or more parameters on path 94. Expiration of watchdog timer 62 might indicate that one or more of the parameters being monitored is stale, missing, or invalid, thus indicating that one or more of auxiliary compute blocks 70 has crashed or failed. If desired, an error correcting code (ECC) scheme can optionally be used to detect and/or correct errors in the parameters.

As another example, the system can self-report an error (e.g., individual auxiliary compute blocks can output respective error signals on paths 96). For instance, XR processing block 72 might output error signal Err1 when it crashes or is otherwise experiencing unstable conditions, gaze tracker 74 might output error signal Err2 when it crashes or is otherwise experiencing unstable conditions, etc. In general, any of the hardware components and software applications can throw an exception or other alert informing the system of a possible failure. If desired, the passthrough video feed can output a default (fallback) virtual content that is not dependent on continued operation of the application-level subsystems 70 and that informs the user of a possible failure. As an example, device 10 might overlay an alert message that reads "please take off the headset" when detecting a critical system failure or a video feed instability. As another example, device 10 might play an audio cue or other audible alert for notifying the user when detecting a system failure/error or video feed instability. If desired, the default virtual content can be pre-rendered or rendered using a reliable (backup) rendering component that is part of blocks 52. Operated in this way, the rendering of the default content is not dependent or reliant on proper operation of auxiliary compute blocks 70.

Figure 4:
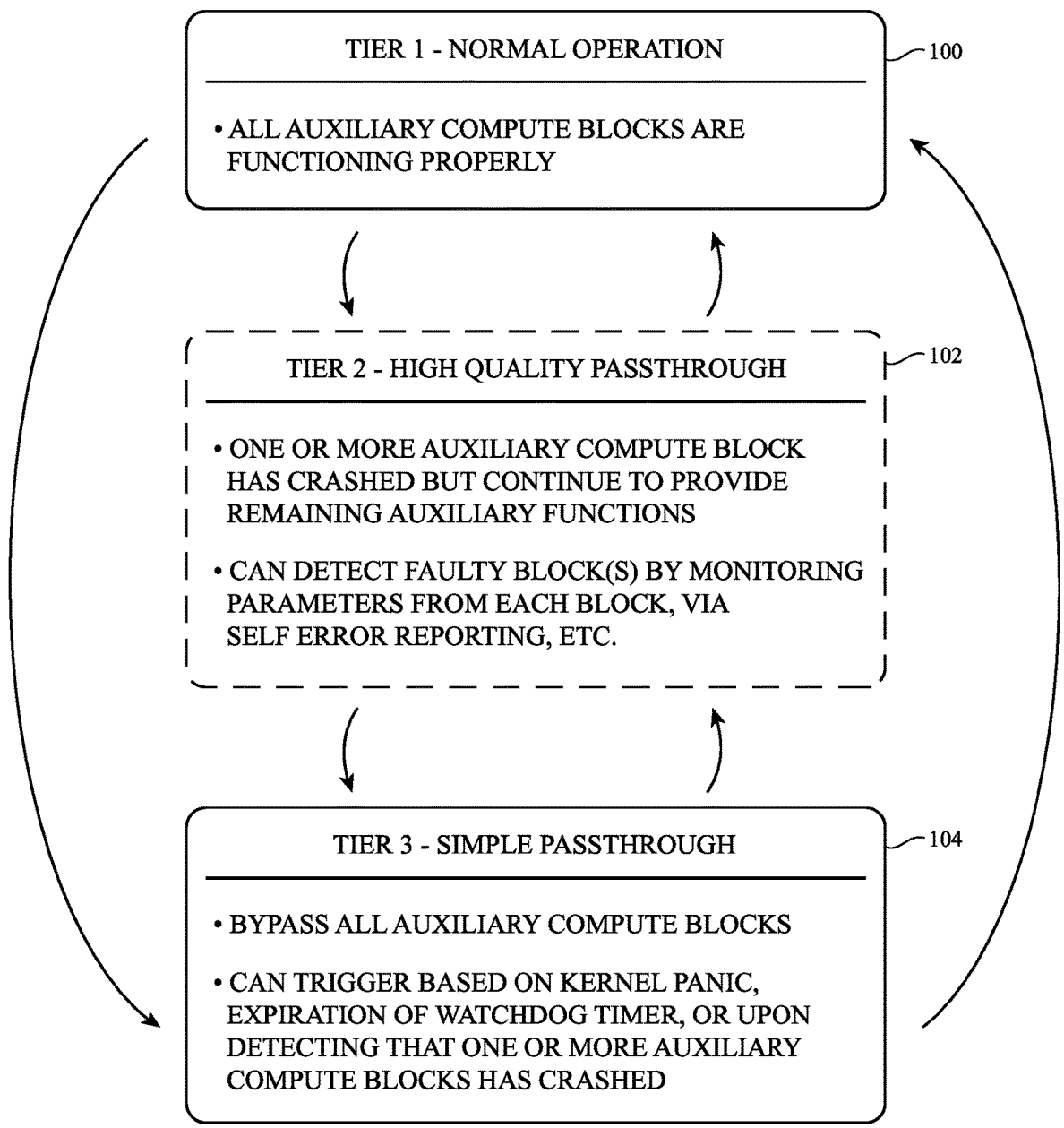
FIG. 4 is a diagram illustrating how a passthrough video stream can be categorized into different tiers depending on current operating conditions in accordance with some embodiments.

FIG. 4 is a diagram illustrating a multi-tiered approach for outputting the passthrough video feed. When all of the auxiliary compute blocks 70 are functioning properly, the passthrough video feed will incorporate all adjustments from the various application-level subsystems. For instance, the VR/AR content overlays provided by block 72, the dynamic foveation provided by block 76, the POV correction provided by block 80, the lens distortion compensation provided by block 82, and all other application-level functions are active. This is sometimes referred to herein as a "tier-1" or normal passthrough operation 100. During the tier-1 normal passthrough operation/mode, only virtual content can optionally be displayed to the user (as an example). In other scenarios, device 10 can also display a combination of virtual and passthrough content during the tier-1 normal passthrough mode.

When one or more of the auxiliary compute blocks 70 has crashed, the crashing blocks can be temporarily bypassed (ignored) or default parameters (sometimes referred to as fallback parameters) can be used for those particular blocks. For instance, if XR processing block 72 has crashed, then the XR processor and other application-level auxiliary compute blocks relying on the rendering function of block 72 can be temporarily suspended and bypassed while other non-failing auxiliary compute blocks can continue to function as intended. As another example, if POV correction block 80 has crashed, then the POV correction block and other application-level auxiliary compute blocks relying on data from the POV correction block can be temporarily suspended and bypassed while other non-failing auxiliary compute blocks can continue to function as intended. As yet another example, if distortion compensation block 82 has crashed, then the distortion compensation block and other application-level auxiliary compute blocks relying on data from the distortion compensation block can be temporarily suspended and bypassed while other non-failing auxiliary compute blocks can continue to function as intended. Faulty blocks can be detected by monitoring parameters from each individual compute block, via self-error reporting, or by monitoring other application-level alert flags output from auxiliary compute blocks 70. This operation in which an at least partially enhanced passthrough video feed can still be output even in the presence of one or more possible errors is sometimes referred to herein as a "tier-2" or high-quality passthrough operation 102 or an intermediate passthrough fallback operation. When device 10 falls back to the tier-2 high-quality passthrough operation, device 10 may output audio or haptic alerts (along with an optional text message) notifying the user of the switch to the tier-2 passthrough mode 102. During the tier-2 high-quality passthrough operation/mode, passthrough content can optionally be blended with some virtual content, and the blended (merged) content can optionally be displayed to the user (as an example).

When one or more of the auxiliary compute blocks 70 has crashed, all of the auxiliary compute blocks can be temporality bypassed/ignored or default (fallback) parameters can be used for all of the auxiliary compute blocks. In this mode, only the functions associated with the dedicated computed blocks 52 are active. For instance, only the basic image signal processing functions provided by block 56 and/or the basic message overlay provided by block 58 is active. This can occur even if only one of the auxiliary compute blocks 70 is faulty. This mode can be triggered when detecting a kernel panic signal or other general operating-system-level panic flag, when detecting expiration of one or more watchdog timers, when detecting that one or more auxiliary compute blocks has crashed (e.g., by monitoring parameters from each individual auxiliary compute block, via self-error reporting, or by monitoring other application-level alert flags output from the auxiliary compute blocks), etc. This operation in which a basic reliable (stable) passthrough video feed passed through to display 14 (without any enhancement or adjustment from the application-level subsystems 70) is sometimes referred to herein as a "tier-3" or simple passthrough operation 104 or a simple passthrough fallback operation. If desired, a safety notice can optionally be overlaid on top of the simple (stable) passthrough video feed. When device 10 falls back to the simple passthrough operation due to detecting a failure in one or more of auxiliary compute blocks or due to other instability in the video feed, device 10 may output audio or haptic alerts (along with an optional text message) notifying the user of the switch to the simple passthrough mode 104. For example, the audio and/or visual messages can tell the user to remove device 10, restart device 10, or otherwise wait for a certain amount of time to allow the failing blocks to recover.

If desired, the crash or failure of certain auxiliary compute blocks 70 might automatically switch the operation of device 10 from tier-1 or tier-2 directly to the tier-3 simple passthrough fallback mode. As an example, in response to detecting that gaze tracker block 74 has crashed, then device 10 can automatically switch to the tier-3 simple passthrough fallback mode to bypass all of the auxiliary compute blocks 70. As another example, in response to detecting that head pose tracker block 78 has crashed, then device 10 can also automatically switch to the tier-3 simple passthrough fallback mode to bypass all of the auxiliary compute blocks 70. This is merely illustrative. The failure of other blocks 70 might also trigger such direct switching to the tier-3 fallback mode.

In some embodiments, device 10 may alternate between normal operating mode 100 and the simple passthrough mode 104 (e.g., the tier-2 operation is not used). In other words, the high-quality passthrough mode 102 is optional. In other embodiments, device 10 might alternate between normal operating mode 100 and the high-quality passthrough mode 102 (e.g., the tier-3 operation is not used). In other words, the simple passthrough mode 104 is optional. In yet other embodiments, device 10 might switch among normal operating mode 100, high-quality passthrough mode 102, and simple passthrough mode 104 (e.g., all three tiers or video passthrough modes are in use).

Figure 5:
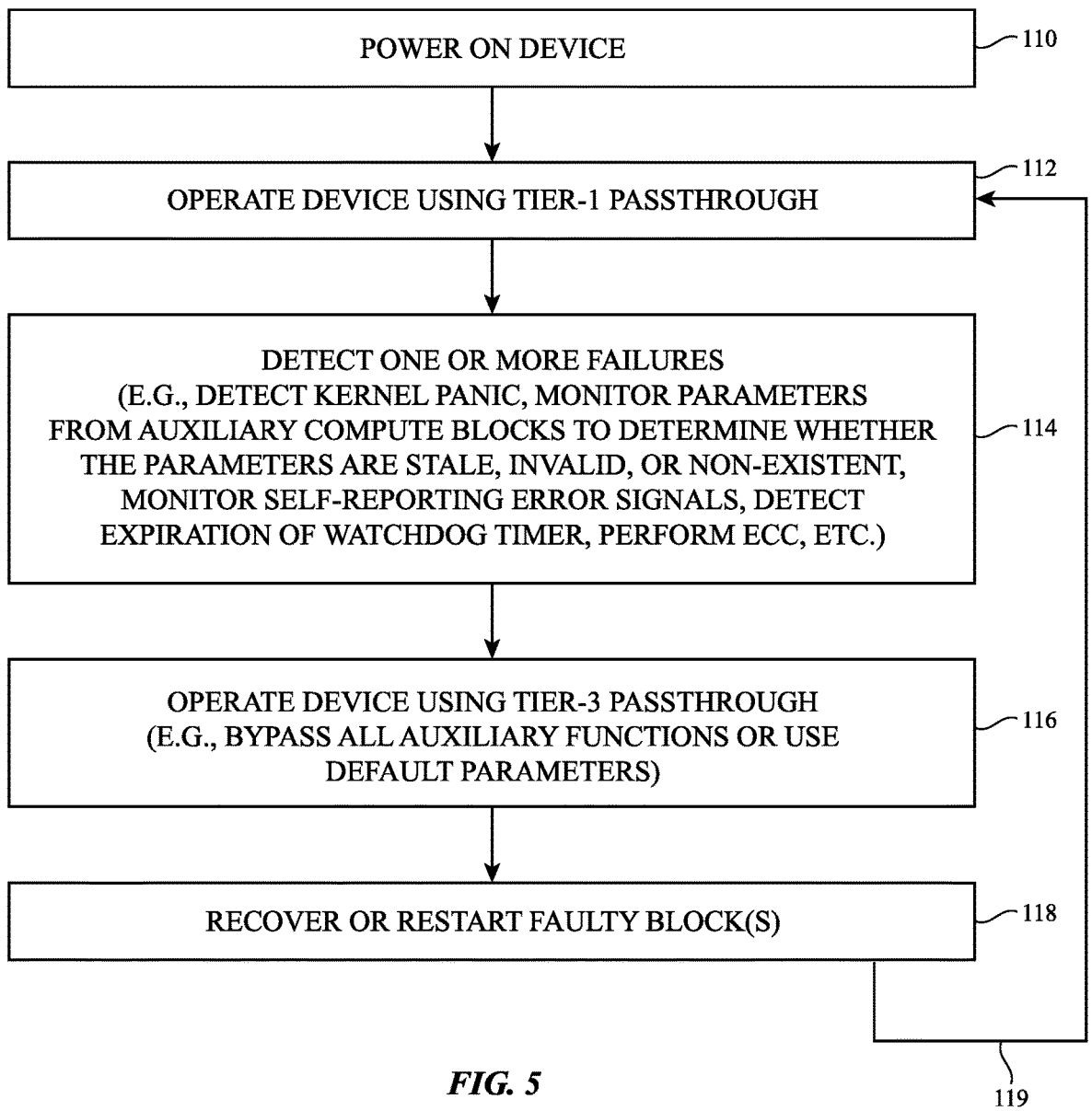
FIG. 5 is a flow chart of illustrative operations for switching between two different tiers in accordance with some embodiments.

FIG. 5 is a flow chart of illustrative operations for using device 10 to switch between the tier-1 normal passthrough mode and the tier-3 simple passthrough fallback mode (sometimes referred to as first and second video passthrough modes, respectively). During the operations of block 110, device 10 can be powered on. After being powered on, device 10 can be operated in the tier-1 normal passthrough mode (see operations of block 112).

During the operations of block 114, device 10 can detect one or more general (system-level) or specific (block-level) failures. For example, device 10 may detect a failure by observing assertion of a kernel panic flag, by monitoring parameters from the auxiliary compute blocks to determine whether a parameter is stale, invalid, or non-existent, by monitoring self-reporting error signals output from the auxiliary compute blocks, by detecting expiration of one or more watchdog timers, by performing ECC operations, or by performing other error/fault detection operations.

In response to detecting a failure during the operations of block 114, device 10 may switch to operating in the tier-3 simple passthrough fallback mode (see operations of block 116). During the simple passthrough fallback mode, all of the auxiliary block functions can be bypassed or default (fallback) parameters may be used for all of the auxiliary compute blocks. For example, during the tier-3 mode, only the basic ISP functions associated with block 56 are applied to the passthrough video feed while the application-level image adjustment algorithms associated with blocks 70 are temporarily suspended or inactive.

During the operations of block 118, the hardware/software subsystems associated with the failing or crashing blocks can be restarted, reset, or otherwise recovered in an attempt to regain proper functionality. Once the problematic blocks are operating properly, device 10 can revert back to operating in the tier-1 normal passthrough mode, as shown by loopback path 119. If desired, device 10 can optionally be restarted (rebooted) if the problematic blocks are not able to recover after a certain period of time. For example, device 10 can optionally be rebooted if one or more of the problematic blocks are not able to recover within 5 seconds, within 10 seconds, within 1-5 seconds, within 5-10 seconds, within 10-20 seconds, or the tier-3 duration exceeds some other threshold. In some embodiments, after device 10 has been operating in the tier-3 simple passthrough mode 104 for a certain period of time, device 10 can optionally transition to yet another mode in which display 14 presents a black screen and/or a cached (default) image while device 10 restarts. If desired, any type of virtual content with a visual message and/or an audio message can be output to the user during this time to let the user know that device 10 rebooting.

The example of FIG. 5 that defaults to the tier-1 normal passthrough operation upon startup (block 112) is merely illustrative. If desired, device 10 can alternatively default to the tier-3 simple passthrough mode (block 116) following startup. Device 10 can eventually switch to operating in the tier-1 normal passthrough mode after verifying that all auxiliary compute block functions are functioning properly.

Figure 6:
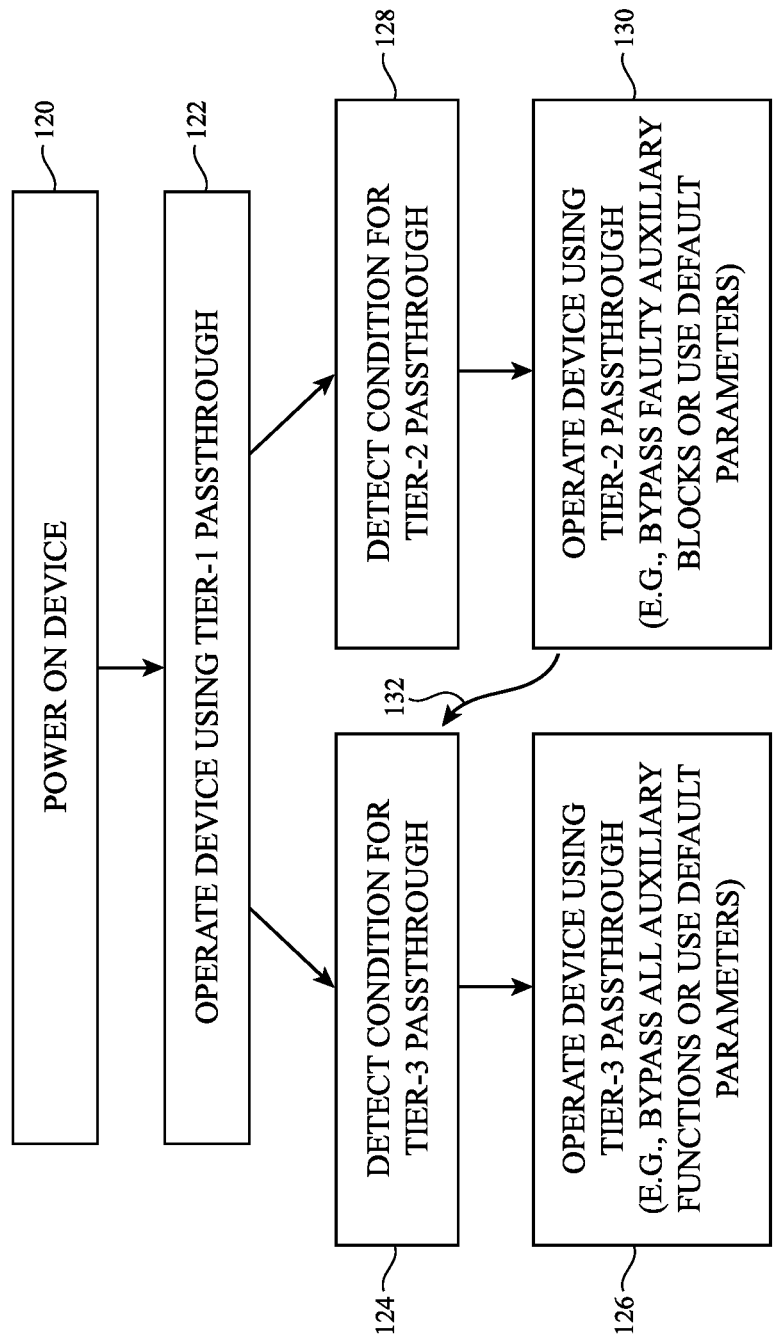
FIG. 6 is a flow chart of illustrative operations for switching a passthrough video stream among three different tiers in accordance with some embodiments.

The example of FIG. 5 in which head-mounted device 10 switches between tier-1 and tier-3 passthrough mode is illustrative. FIG. 6 is a flow chart of illustrative operations for using device 10 to switch among the tier-1 normal passthrough mode, the tier-3 simple passthrough fallback mode, and the tier-2 high-quality passthrough fallback mode. During the operations of block 120, device 10 can be powered on. After being powered on, device 10 can be operated in the tier-1 normal passthrough mode (see operations of block 122).

During the operations of block 124, device 10 can detect a condition for triggering the tier-3 simple passthrough fallback mode. For example, device 10 may detect a general failure by observing assertion of a kernel panic flag, by detecting expiration of one or more watchdog timers, or by performing other error detection operations indicative of a system-level fault.

In response to detecting a condition for triggering the tier-3 operation, device 10 may switch to operating in the tier-3 simple passthrough fallback mode (see operations of block 126). During the simple passthrough fallback mode, all of the auxiliary block functions can be bypassed or default (fallback) parameters may be used for all of the auxiliary compute blocks. For example, during the tier-3 mode, only the basic ISP functions associated with block 56 are applied to the passthrough video feed while the application-level image adjustment algorithms associated with blocks 70 are temporarily suspended or inactive. During this time, the hardware/software subsystems associated with the failing or crashing blocks can be restarted or reset in an attempt to regain proper functionality. Once the problematic blocks are operating properly, device 10 can revert back to operating in the tier-1 normal passthrough mode (e.g., looping back to the operations of block 122). If desired, it is also possible for device 10 switch from operating in the tier-3 simple passthrough mode to operating in the tier-2 high-quality passthrough mode if the condition for triggering the tier-2 operation is satisfied. For example, automatic switching from the tier-3 mode to the tier-2 mode might be triggered when a more critical auxiliary compute block such as the gaze tracker recovers and regains proper functionality but a less critical auxiliary compute block such as the VR content processor is still failing or attempting recovery.

During the operations of block 128, device 10 can detect a condition for triggering the tier-2 high-quality passthrough fallback mode. For example, device 10 may detect a specific failure by monitoring parameters from the auxiliary compute blocks to determine whether a parameter is stale, invalid, or non-existent, by monitoring self-reporting error signals output from the auxiliary compute blocks, by performing ECC operations, or by performing other error/fault detection operations.

In response to detecting a condition for triggering the tier-2 operation, device 10 may switch to operating in the tier-2 high quality passthrough fallback mode (see operations of block 130). During the high-quality passthrough fallback mode, only some (a subset) of the auxiliary block functions can be bypassed or default (fallback) parameters may be used for the faulty auxiliary compute block(s). For example, during the tier-2 mode, all functions associated with a crashing XR processing block 72 can be bypassed or ignored while functions associated with the remaining properly functioning auxiliary compute blocks 70 are still in play. In other words, only the functions associated with the failing auxiliary compute block(s) are temporarily suspended or inactive. During this time, the hardware/software subsystems associated with the failing or crashing blocks or device 10 can be restarted or reset in an attempt to regain proper functionality. Once the problematic blocks are operating properly, device 10 can revert back to operating in the tier-1 normal passthrough mode (e.g., looping back to the operations of block 122). If desired, it is also possible for device 10 switch from the tier-2 mode to operating in the tier-3 simple passthrough mode if the condition for triggering the tier-3 operation is satisfied, as shown by path 132. For example, automatic switching from the tier-2 mode to the tier-3 mode might be triggered when a more critical auxiliary compute block such as the gaze tracker fails.

The methods and operations described above in connection with FIGS. 1-6 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., the storage circuitry within control circuitry 20 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., one or more processors in control circuitry 20). The processing circuitry may include microprocessors, application processors, digital signal processors, central processing units (CPUs), application-specific integrated circuits with processing circuitry, or other processing circuitry.

A physical environment refers to a physical world that people can sense and/or interact with without the aid of an electronic device. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics.

Many different types of electronic systems can enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers.

The foregoing is merely illustrative and various modifications can be made to the described embodiments. The foregoing embodiments may be implemented individually or in any combination.

What is claimed is:

1. A method of operating an electronic device having at least one image sensor, a first set of compute blocks, and a second set of compute blocks, the method comprising:
   acquiring a video feed using the at least one image sensor;
   identifying a condition of the first set of compute blocks;
   determining whether to operate in a first video passthrough mode or a second video passthrough mode based on the identified condition of the first set of compute blocks;
   identifying first processing functions to be performed by the first set of compute blocks on the video feed;
   while operating in the first video passthrough mode, processing the video feed for display by using the first set of compute blocks to perform the first processing functions and using the second set of compute blocks to perform second processing functions, different than the first processing functions, on the video feed, wherein the first set of compute blocks is configured to output one or more parameters to the second set of compute blocks during the first video passthrough mode; and
   while operating in the second video passthrough mode, processing the video feed for display by using the first set of compute blocks to perform a subset of the first processing functions based on the one or more parameters and using the second set of compute blocks to perform the second processing functions on the video feed.

2. The method of claim 1, wherein the first processing functions performed by the first set of compute blocks during the first video passthrough mode comprises functions selected from the group consisting of: extended reality content generation, gaze tracking, head pose tracking, dynamic foveation, point of view correction, distortion compensation, and 3-dimensional matting.

3. The method of claim 2, wherein the second processing functions performed by the second set of compute blocks during the first and second video passthrough modes comprise functions selected from the group consisting of: automatic exposure, automatic white balance, tone curve mapping, gamma correction, shading correction, noise reduction, black level adjustment, demosaicing, and image sharpening.

4. The method of claim 1, wherein identifying the condition of the first set of compute blocks comprises detecting a failure in at least one of the first set of compute blocks or detecting unstable operation of at least one of the first set of compute blocks.

5. The method of claim 4, wherein detecting the condition comprises detecting a kernel panic signal.

6. The method of claim 4, wherein detecting the condition comprises detecting expiration of a watchdog timer.

7. The method of claim 4, wherein detecting the condition comprises using the second set of compute blocks to detect whether the one or more parameters output from the first set of compute blocks is stale, missing, or invalid.

8. The method of claim 4, wherein detecting the condition comprises using the second set of compute blocks to detect one or more error signals from the first set of compute blocks.

9. The method of claim 1, further comprising:
   while operating in the second video passthrough mode, applying a default setting associated with at least one of the first set of compute blocks to the video feed.

10. A method of operating an electronic device having at least one camera, a first set of compute blocks, and a second set of compute blocks, the method comprising:
    acquiring a video feed using the at least one camera;
    identifying a condition of the first set of compute blocks;
    determining whether to operate in a first video passthrough mode or a second video passthrough mode based on the identified condition of the first set of compute blocks;
    identifying first adjustments to be applied by the first set of compute blocks on the video feed;
    while operating in the first video passthrough mode, processing the video feed for display by using the first set of compute blocks to apply the first adjustments to the video feed and using the second set of compute blocks to apply second adjustments, different than the first adjustments, to the video feed; and
    while operating in the second video passthrough mode, processing the video feed for display by using the first set of compute blocks to apply third adjustments, different than the first adjustments, to the video feed and using the second set of compute blocks to apply the second adjustments to the video feed.

11. The method of claim 10, wherein the first and third adjustments applied by the first set of compute blocks comprise one or more functions selected from the group consisting of: extended reality content generation, gaze tracking, head pose tracking, dynamic foveation, point of view correction, distortion compensation, and 3-dimensional matting.

12. The method of claim 10, wherein identifying the condition of the first set of compute blocks comprises detecting a failure in the first set of compute blocks or detecting unstable operation of the first set of compute blocks.

13. The method of claim 10, wherein detecting the condition comprises detecting a kernel panic signal or expiration of a watchdog timer.

14. The method of claim 10, wherein detecting the condition comprises:
    using the second set of compute blocks to monitor one or more parameters output from the first set of compute blocks, wherein the third adjustments applied by the first set of compute blocks during the second video passthrough mode are determined based on the one or more parameters.

15. The method of claim 12, wherein detecting the condition comprises detecting one or more error signals from the first set of compute blocks.

16. A method of operating a head-mounted device operable in first, second, and third video passthrough modes, comprising:
    using one or more cameras to acquire a video feed;
    using an image signal processor to process the video feed;
    identifying a plurality of auxiliary compute blocks to be used for processing the video feed;

during the first video passthrough mode, processing the video feed using the image signal processor and the plurality of auxiliary compute blocks;

determining whether a first mode switching condition or a second mode switching condition, different than the first mode switching condition, has been met;

in response to determining that the first mode switching condition has been met, switching from the first video passthrough mode to the second video passthrough mode and processing, during the second video passthrough mode, the video feed using the image signal processor while bypassing a first number of auxiliary compute blocks in the plurality of auxiliary compute blocks; and in response to determining that the second mode switching condition has been met, switching from the first video passthrough mode to the third video passthrough mode and processing, during the third video passthrough mode, the video feed using the image signal processor while bypassing a second number, different than the first number, of auxiliary compute blocks in the plurality of auxiliary compute blocks.

17. The method of claim 16, wherein using the image signal processor to process the video feed comprises using the image signal processor to perform one or more functions selected from the group consisting of: automatic exposure, automatic white balance, tone curve mapping, gamma correction, shading correction, noise reduction, black level adjustment, demosaicing, and image sharpening.

18. The method of claim 17, plurality of auxiliary compute blocks is configured to perform one or more functions selected from the group consisting of: extended reality content generation, gaze tracking, head pose tracking, dynamic foveation, point of view correction, distortion compensation, and 3-dimensional matting.

19. The method of claim 16, wherein determining whether the first mode switching condition has been met comprises detecting a kernel panic signal or detecting expiration of a watchdog timer.

20. The method of claim 19, wherein determining whether the second mode switching condition has been met comprises monitoring one or more parameters output from the plurality of auxiliary compute blocks, the method further comprising:

changing a number of active compute blocks in the plurality of auxiliary compute blocks from the first number to the second number based on the one or more parameters in response to determining that the second mode switching condition has been met.

21. The method of claim 16, further comprising:
after operating the head-mounted device in third video passthrough mode for a period of time exceeding a threshold, restarting the head-mounted device.

22. The method of claim 16, further comprising:
in response to switching from the first video passthrough mode to the second video passthrough mode, outputting a first visual, audio, or haptic alert; and
in response to switching from the first video passthrough mode to the third video passthrough mode, outputting a second visual, audio, or haptic alert different than the first visual, audio, or haptic alert.

* * * * *